(12) United States Patent
Nakagawa et al.

(10) Patent No.: US 8,323,117 B2
(45) Date of Patent: Dec. 4, 2012

(54) WHEEL BEARING DEVICE, METHOD OF ASSEMBLING WHEEL BEARING DEVICE, ASSEMBLY CONFIGURED BY WHEEL BEARING DEVICE AND DRIVE SHAFT, AND METHOD OF ASSEMBLING ASSEMBLY

(75) Inventors: Tohru Nakagawa, Iwata (JP); Yuichi Asano, Iwata (JP); Masahiro Ozawa, Iwata (JP)

(73) Assignee: NTN Corporation, Osaka (JP)

( * ) Notice: Subject to any disclaimer, the term of this patent is extended or adjusted under 35 U.S.C. 154(b) by 233 days.

(21) Appl. No.: 12/599,536

(22) PCT Filed: May 14, 2008

(86) PCT No.: PCT/JP2008/058871
§ 371 (c)(1),
(2), (4) Date: Nov. 10, 2009

(87) PCT Pub. No.: WO2008/143102
PCT Pub. Date: Nov. 27, 2008

(65) Prior Publication Data
US 2010/0216557 A1 Aug. 26, 2010

(30) Foreign Application Priority Data
May 15, 2007 (JP) .................................. 2007-129621

(51) Int. Cl.
*F16D 3/224* (2011.01)
(52) U.S. Cl. .................... 464/178; 29/898.062; 464/906
(58) Field of Classification Search .................. 464/178, 464/905, 906; 384/544, 589; 29/898.062
See application file for complete search history.

(56) References Cited

U.S. PATENT DOCUMENTS

| 6,146,022 A | 11/2000 | Sahashi et al. |
| 6,497,515 B1 | 12/2002 | Sahashi et al. |

(Continued)

FOREIGN PATENT DOCUMENTS
JP 08-226426 9/1996
(Continued)

OTHER PUBLICATIONS
International Search Report issued Aug. 12, 2008 in International (PCT) Application No. PCT/JP2008/058871.
(Continued)

*Primary Examiner* — Gregory Binda
(74) *Attorney, Agent, or Firm* — Wenderoth, Lind & Ponack, L.L.P.

(57) ABSTRACT

A wheel bearing device, a method of assembling a wheel bearing device, an assembly configured by the wheel bearing device and a drive shaft, and a method of assembling the assembly, in which the wheel bearing device eliminates a nut tightening operation, is capable of reducing costs, and has a projection and recess mating structure that can firmly connect an outer joint member and a hub. Axial direction load is applied to a stepped surface is provided on an outer diameter surface of an outer joint member. A projection that extends in the axial direction and is provided on one of a stem shaft of the outer joint member and an inner diameter surface of a hole section of a hub is press-fitted into a partner member along the axial direction, As a result, a recess that is in close contact with the projection over an overall mating contact area is formed in the partner member, thereby configuring a projection and recess mating structure.

18 Claims, 11 Drawing Sheets

U.S. PATENT DOCUMENTS

| | | |
|---|---|---|
| 7,104,893 B2 * | 9/2006 | Ouchi et al. ............... 464/178 |
| 2002/0044706 A1 | 4/2002 | Kayama et al. |
| 2002/0126929 A1 | 9/2002 | Ozawa et al. |
| 2003/0081872 A1 | 5/2003 | Sahashi et al. |
| 2004/0158988 A1 | 8/2004 | Ozawa et al. |

FOREIGN PATENT DOCUMENTS

| | | |
|---|---|---|
| JP | 2001-18604 | 1/2001 |
| JP | 2002-137604 | 5/2002 |
| JP | 2002-254901 | 9/2002 |
| JP | 2004-270855 | 9/2004 |
| JP | 2007-30880 | 2/2007 |

OTHER PUBLICATIONS

International Preliminary Report on Patentability and Written Opinion of the International Searching Authority dated Dec. 3, 2009 in International (PCT) Application No. PCT/JP2008/058871.

* cited by examiner

WHEEL BEARING DEVICE, METHOD OF ASSEMBLING WHEEL BEARING DEVICE, ASSEMBLY CONFIGURED BY WHEEL BEARING DEVICE AND DRIVE SHAFT, AND METHOD OF ASSEMBLING ASSEMBLY

BACKGROUND OF THE INVENTION

I. Technical Field

The present invention relates to a wheel bearing device, a method of assembling the wheel bearing device, an assembly configured by the wheel bearing device and a drive shaft, and a method of assembling the assembly.

II. Description of the Related Art

As shown in FIG. 11, a drive shaft that transmits power from an engine to a driving wheel has a configuration in which an outboard-side (an outer side of a vehicle when assembled to the vehicle) fixed constant velocity universal joint 104 and an inboard-side (an inner side of the vehicle when assembled to the vehicle) sliding-type constant velocity universal joint (not shown) are connected by an intermediate shaft (not shown). The outboard-side fixed constant velocity universal joint 104 is connected to a hub 102 that is supported by a wheel bearing device such as to rotate freely.

A so-called third generation wheel bearing device includes the hub 102, the constant velocity universal joint 104, and an outer member 105. The hub 102 has a flange 101 extending in an outward radial direction. An outer joint member 103 of the constant velocity universal joint 104 is fixed to the hub 102. The outer member 105 configures a portion of a wheel bearing and is disposed on an outer circumferential side of the hub 102.

The constant velocity universal joint 104 includes the outer joint member 103, an inner joint member 108, a ball 109, and a cage 110. The inner joint member 108 is disposed within a bowl-shaped section 107 of the outer joint member 103. The ball 109 is disposed between the inner joint member 108 and the outer joint member 103. The cage 110 holds the ball 109. A spline section 111 is formed on an inner circumferential surface of a center hole in the inner joint member 108. An end section spline section of a shaft (not shown) is inserted into the center hole. As a result, the spline section 111 on the inner joint member 108 side and the spline section on the shaft side are engaged.

The hub 102 has a cylindrical section 113 and the flange 101. A short, cylindrical pilot section 115 is provided on an outer end surface (counter-joint side end surface) of the flange 101 such as to project from the outer end surface. A wheel and a brake rotor (not shown) are mounted on the pilot section 115. The pilot section 115 is configured by a first section 115a having a large diameter and a second section 115b having a small diameter. The brake rotor is fitted onto the first section 115a, and the wheel is fitted onto the second section 115b.

A small diameter stepped section 116 is provided on an outer circumferential surface of the bowl-shaped section 107 side end section of the cylindrical section 113. An inner ring 117 configuring an inner member of the wheel bearing is fitted onto the small diameter stepped section 116. A first inner raceway surface 118 is provided on an outer circumferential surface of the cylindrical section 113 of the hub 102, near the flange. A second inner raceway surface 119 is provided on an outer circumferential surface of the inner ring 117. A bolt mounting hole 112 is provided in the flange 101 of the hub 102. A hub bolt 135 used to fix the wheel and the brake rotor to the flange 101 is inserted into the bolt attaching hole 112.

Double-row outer raceway surfaces 120 and 121 are provided on an inner periphery of the outer member 105 of the wheel bearing. A flange (vehicle body attaching flange) 132 is provided on an outer periphery of the outer member 105. The first outer raceway surface 120 of the outer member 105 and the first inner raceway surface 118 of the hub 102 oppose each other. The second raceway surface 121 of the outer member 105 and the second inner raceway surface 119 of the inner ring 117 oppose each other. Rolling elements 122 are interposed between the outer and inner raceway surfaces.

A stem shaft 123 of the outer joint member 103 is inserted into the cylindrical section 113 of the hub 102. A screw section 124 is formed on an end section the stem shaft 123 in the counter-bowl-shaped section. A spline section 125 is formed between the screw section 124 and the bowl-shaped section 107. A spline section 126 is also formed on an inner circumferential surface (inner diameter surface) of the cylindrical section 113 of the hub 102. When the stem shaft 123 is inserted into the cylindrical section 113 of the hub 102, the spline section 125 on the stem shaft 123 side and the spline section 126 on the hub 102 side become engaged.

As described in Japanese Patent Laid-open Publication No. 2004-270855, a nut member 127 is screwed onto the screw section 124 of the stem shaft 123 projecting from the cylindrical section 113, and the hub 102 and the outer joint member 103 are connected. At this time, an inner end surface (rear surface) 128 of the nut member 127 and an outer end surface 129 of the cylindrical section 113 come into contact. In addition, an end surface 130 of the bowl-shaped section 107 on a shaft section side and an outer end surface 131 of the inner ring 117 come into contact. In other words, as a result of the nut member 127 being tightened, the hub 102 is sandwiched between the nut member 127 and the bowl-shaped section 107 with the inner ring 117 therebetween. As a result, the outer joint member 107 and the hub 102 are positioned in an axial direction, and a predetermined preload is applied to the wheel bearing device.

Patent Document 1: Japanese Patent Laid-open Publication No. 2004-270855

SUMMARY OF THE INVENTION

Conventionally, the spline section 125 on the shaft section 123 side and the spline section 126 on the hub 102 side are engaged, as described above. Therefore, spline processing is required to be performed on both the shaft section 123 side and the hub 102 side, causing an increase in cost. In addition, during press-fitting, projections and recesses of the spline section 125 on the shaft section 123 side and the spline section 126 on the hub 102 side are required to be aligned. At this time, when press-fitting is performed by tooth flanks being aligned, projecting and recessing teeth may become damaged (gouged). When press-fitting is performed by large diameters of the projecting and recessing teeth being aligned without aligning the tooth flanks, backlash occurs easily in the circumferential direction. When backlash in the circumferential direction occurs in this way, transmission of rotation torque deteriorates, and abnormal noise may also occur. Therefore, when spline engagement is used as in the conventional technology, it is difficult to prevent both damage to the projecting and recessing teeth, and backlash in the circumferential direction.

The nut member 127 is required to be screwed onto the screw section 124 of the shaft section 123 projecting from the cylindrical section 113. Therefore, assembly includes a screw tightening operation. Workability deteriorates, the number of components increases, and product manageability also deteriorates.

Therefore, in recent years, a method of connecting the outer joint member 103 of the constant velocity universal joint 104 and the hub 102 has been considered in which a projection and recess mating structure is used to integrally connect the outer joint member 103 and the hub 102 (plastic bonding method). The projection and recess mating structure is configured by a projection that extends in an axial direction and is provided on one of an outer diameter surface of the stem shaft 123 of the outer joint member 103 and an inner diameter surface of the hole section of the hub 102 being press-fitted into the other along the axial direction, and a recess that mates in close contact with the projection being formed on the other by the projection. As a result of this configuration, the backlash in the circumferential direction of the projection and recess mating structure section can be eliminated. In addition, the nut tightening operation for integrating the hub 102 and the constant velocity universal joint 104 can be eliminated.

When the stem shaft 123 of the outer joint member 103 in a single-unit state is press-fitted into the hub 102, the stem shaft 123 can be press-fitted by an axial direction load being applied to the outer end surface of the outer joint member 103. However, in an instance such as this, internal components (the inner joint member, the ball, the cage, and the like) of the constant velocity joint are required to be assembled in a state in which the stem shaft 123 is press-fitted into the outer joint member 103 of the hub 102. Therefore, workability after press-fitting may be hindered, and handling on a conventional drive shaft assembly line on which nut tightening is performed is extremely difficult.

In a drive shaft configured by constant velocity universal joints being assembled to both ends of the shaft, when the stem shaft of the outer joint member of the outboard-side constant velocity universal joint is press-fitted into the hub, the axial center of the outer joint member may be at an angle to the axial center of the hub during press-fitting, and a press-fitting surface to which press-fitting force is applied may be difficult to secure. In particular, a boot is difficult to attach after press-fitting. Therefore, the boot is attached before press-fitting. As a result, the outer end surface of the outer joint member cannot be pressed, and a stable press-fitting operation becomes difficult. When the press-fitting force is applied to the stem shaft end surface of the outer joint member of the inboard-side constant velocity universal joint, the area of the pressing section is small and pressing force (press-fitting force) application is unstable. In addition, the internal components (the inner ring, the cage, the ball, and the like) of the constant velocity universal joint may become damaged as a result of application of the press-fitting force.

Therefore, the present invention has been proposed in light of the above-described problems. An object of the present invention is to provide a wheel bearing device, a method of assembling the wheel bearing device, an assembly configured by the wheel bearing device and a drive shaft, and a method of assembling the assembly, in which the wheel bearing device has a projection and recess mating structure that can eliminate a nut tightening operation, reduce costs, and firmly connect an outer joint member and a hub.

To solve the above-described issues, a wheel bearing device according to a first aspect of the present invention includes an outer member having double row raceway surfaces on an inner periphery, an inner member having double row raceway surfaces opposing the raceway surfaces and a wheel attaching flange on an outer periphery on an out-board side end, and double row rolling elements interposed between the raceway surfaces of the outer member and the inner member. The inner member is configured by a hub having the flange and an inner ring that is press-fitted onto a shaft section of the hub. A shaft section of an outer joint member of a constant velocity universal joint fitted into a hole section of the hub is integrated with the hub by a projection and recess mating structure. A stepped surface is provided on an outer diameter surface of the outer joint member. The projection and recess mating structure is configured by a projection that extends in an axial direction and is provided on one of a stem shaft of the outer joint member and an inner diameter surface of the hole section of the hub being press-fitted into a partner member by axial direction load being applied onto the stepped surface, and the projection forming a recess that mates in close contact with the projection in the partner member.

In the wheel bearing device of the present invention, because the projection and recess mating structure connecting the hub and the stem shaft of the outer joint member of the constant velocity universal joint fitted into the hole section of the hub is provided, bolts and the like are not required to connect the stem shaft and the hub. The stepped surface is provided on the outer diameter surface of the outer joint member. During press-fitting, the axial direction load can be applied to the outer joint member via the stepped surface. The projection of the projection and recess mating structure is press-fitted into the partner member. As a result, a recess that mates in close contact with the projection is formed in the partner member.

A wheel bearing device according to a second aspect of the present invention includes an outer member having double row raceway surfaces on an inner periphery, an inner member having double row raceway surfaces opposing the raceway surfaces and a wheel attaching flange on an outer periphery on an out-board side end, and double row rolling elements interposed between the raceway surfaces of the outer member and the inner member. The inner member is configured by a hub having the flange and an inner ring that is press-fitted onto a shaft section of the hub. A shaft section of an outer joint member of a constant velocity universal joint fitted into a hole section of the hub is integrated with the hub by a projection and recess mating structure. A stepped surface is provided on an outer diameter surface of the outer joint member. The projection and recess mating structure is configured by a projection that extends in an axial direction and is provided on one of a stem shaft of the outer joint member and an inner diameter surface of the hole section of the hub being press-fitted into a partner member by axial direction load being applied onto the stepped surface, and the projection forming a recess that mates in close contact with the projection in the partner member. The projection and recess mating structure allows detachment by an axial direction pulling force being applied.

In the second wheel bearing device as well, bolts and the like are not required to connect the stem shaft and the hub. The stepped surface is provided on the outer diameter surface of the outer joint member. During press-fitting, the axial direction load can be applied to the outer joint member via the stepped surface. In addition, the projection and recess mating structure allows detachment by application of a pulling force in the axial direction. When the stem shaft of the outer joint member is press-fitted into the hub again after the stem shaft of the outer joint member is pulled out of the hole section of the hub, the projection and recess mating structure in which the overall mating contact areas of the projection and the recess are in close contact can be configured.

In the wheel bearing device, for example, among the double row raceways of the inner member, one row can be directly formed in the shaft section of the hub and the other row can be formed in the inner ring press-fitted onto the shaft section of the hub.

A recessing groove can be provided on the outer diameter surface of the outer joint member, and a radial direction end surface of the recessing groove can configure the stepped surface. Alternatively, a projection can be provided on the outer diameter surface of the outer joint member, and a radial direction end surface of the projection can configure the stepped surface. A hardening process is preferably performed on and near the stepped surface.

In an assembly of the present invention, a wheel bearing device of the present invention can be used as a wheel bearing device configured by an outboard-side constant velocity universal joint, a hub, and a wheel bearing. The outboard-side constant velocity universal joint is provided in a drive shaft including the outboard-side constant velocity universal joint, an inboard-side constant velocity universal joint, a shaft connecting between the constant velocity universal joints, and boots attached to the constant velocity universal joints.

In a method of assembling a wheel bearing device of the present invention, a hub, a double-row wheel bearing, and a constant velocity universal joint form a unit. The hub and a stem shaft of an outer joint member of the constant velocity universal joint fitted into a hole section of the hub are connected by a projection and recess mating structure. The projection and recess mating structure is configured by axial direction force being applied to a stepped surface provided on an outer diameter surface of the outer joint member by a press-fitting jig, a projection that extends in an axial direction and is provided on one of a stem shaft of the outer joint member and an inner diameter surface of the hole section of the hub being press-fitted into a partner member along the axial direction, and a recess that is in close contact with the projection over an overall mating contact area being formed in the partner member.

In the method of assembling a wheel bearing device of the present invention, as a result of the axial direction load being applied to the stepped surface provided on the outer diameter surface of the outer joint member, the projection of the projection and recess mating structure is press-fitted into the partner member. As a result, the recess that mates with the projection is formed in the partner member.

The press-fitting jig can be configured by a ring-shaped body that applies the axial direction load by coming into direct contact with the stepped surface provided on the outer diameter surface of the outer joint member.

A method of assembling an assembly of the present invention is a method of assembling an assembly in which an outboard-side constant velocity universal joint in a drive shaft including the outboard-side constant velocity universal joint, an inboard-side constant velocity universal joint, and a shaft connecting between the constant velocity universal joints is configured by a wheel bearing device. In the outboard-side constant velocity universal joint, a projection and recess mating structure is configured by axial direction force being applied to a stepped surface provided on an outer diameter surface of an outer joint member by a press-fitting jig, a projection that extends in an axial direction and is provided on one of a stem shaft of the outer joint member and an inner diameter surface of a hole section of a hub being press-fitted into a partner member along the axial direction, and a recess that is in close contact with the projection over an overall mating contact area being formed in the partner member.

The press-fitting jig can be configured by a ring-shaped body that applies the axial direction load by coming into direct contact with the stepped surface provided on the outer diameter surface of the outer joint member, and a pipe body having an inner diameter dimension that is greater than outer diameter dimensions of the outboard-side constant velocity universal joint and the inboard-side constant velocity universal joint. Both constant velocity universal joints are housed within the pipe body during press-fitting. The axial direction force is applied to an outer end surface of the pipe body projecting further outward in the axial direction than the inboard-side constant velocity universal joint.

In the present invention, because the projection and recess mating structure is included that connects the hub and the stem shaft of the outer joint member of the constant velocity universal joint that is fitted into the hole section of the hub, backlash in the circumferential direction of the projection and recess mating structure can be eliminated. In addition, a nut tightening operation is not required to connect the stem shaft and the hub. Therefore, the assembly operation can be facilitated. Cost related to the assembly operation can be reduced. Weight reduction can also be achieved.

During press-fitting, the axial direction pressing force can be applied to the outer joint member via the stepped surface on the outer diameter surface of the outer joint member. Therefore, an axial direction pressing force application area can be secured. In addition, because the stepped surface provided on the outer diameter surface of the outer joint member is pressed, compared to when the opening end surface or the like of the outer joint member is pressed, the vicinity of the stem shaft of the outer joint member that is a press-fitting shaft can be pressed, allowing a stable press-fitting operation.

When the outer joint member is removed from the hole section of the hub by a pulling force being applied in the axial direction to the stem shaft of the outer joint member, workability of repair and inspection (maintenance) of each component can be enhanced. In addition, as a result of the shaft section of the outer joint member being press-fitted into the hole section of the hub again after the repair and inspection of each component, the projection and recess mating structure in which the overall mating contact areas between the projection and the recess are in close contact can be configured. Therefore, a wheel bearing device that allows stable torque transmission can be configured again.

Even when the stepped surface is the radial direction end surface of the recessing groove, or the radial direction end surface of the projection, reliability of securing an axial direction pressing force application area is enhanced. A more stable press-fitting operation can be performed.

A hardening process is preferably performed on the stepped surface and its vicinity. In this way, as a result of the hardening process being performed, the stepped surface and its vicinity can be hardened. Load-tolerance can be enhanced. The stepped surface can be stabilized in terms of strength. In other words, even when the stepped surface is small, the axial direction pressing force required for the press-fitting operation can be applied. Processing costs, material costs, and the like can be reduced. The wheel bearing device can be made more compact.

When the press-fitting jig is configured by the ring-shaped body formed using split mold and which applies axial direction load by coming into direct contact with the stepped surface provided on the outer diameter surface of the outer joint member, the jig for applying pressing force onto the stepped surface can be stably attached. In particular, when the press-fitting jig is configured by the ring-shaped body and the pipe body having an inner diameter dimension that is greater than the outer diameter dimensions of the outboard-side constant velocity universal joint and the inboard-side constant velocity universal joint, the pressing force can be stably applied without position control of the drive shaft within the pipe body being performed. In other words, even when the shaft or the like in the drive shaft within the pipe body shifts in relation to the axial center of the pipe body during press-fitting, the vicinity of the stem shaft of the outer joint member that is the press-fitting shaft can be pressed regardless of the position of the drive shaft. The pressing force can be stably applied

DETAILED DESCRIPTION OF THE INVENTION

Figure 1:
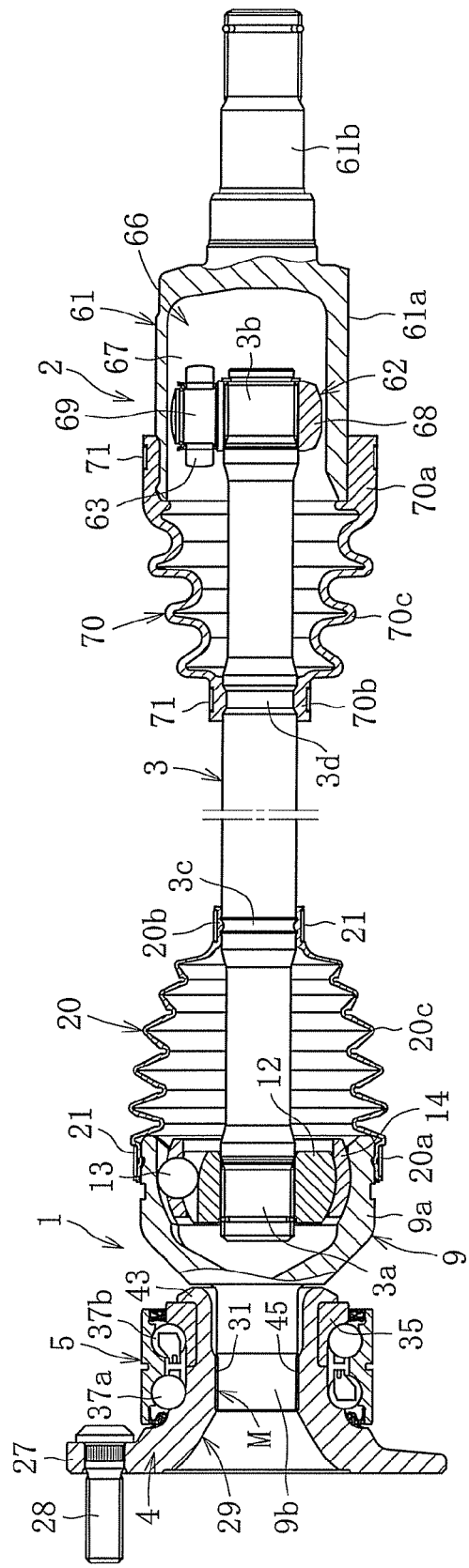
FIG. 1 is a vertical cross-sectional view of an assembly configured by a wheel bearing device and a drive shaft, according to a first embodiment of the present invention.

Embodiments of the present invention will be described below with reference to FIG. 1 to FIG. 10. FIG. 1 is a diagram of an assembly configured by a wheel bearing device and a drive shaft. The wheel bearing device includes an outboard-side constant velocity universal joint 1, an inboard-side constant velocity universal joint 2, and a shaft 3 connected to the constant velocity universal joints 1 and 2. In this instance, on the outboard side, the wheel bearing device is configured by a hub 4, a double-row wheel bearing 5, and the constant velocity universal joint 1 that are connected. The outboard side (left-hand side in FIG. 1) is on the outer side of a vehicle, such as an automobile, in a state in which the wheel bearing device is assembled to the vehicle. The inboard side (right-hand side in FIG. 1) is on the inner side of a vehicle, such as an automobile, in a state in which the wheel bearing device is assembled to the vehicle.

Figure 2:
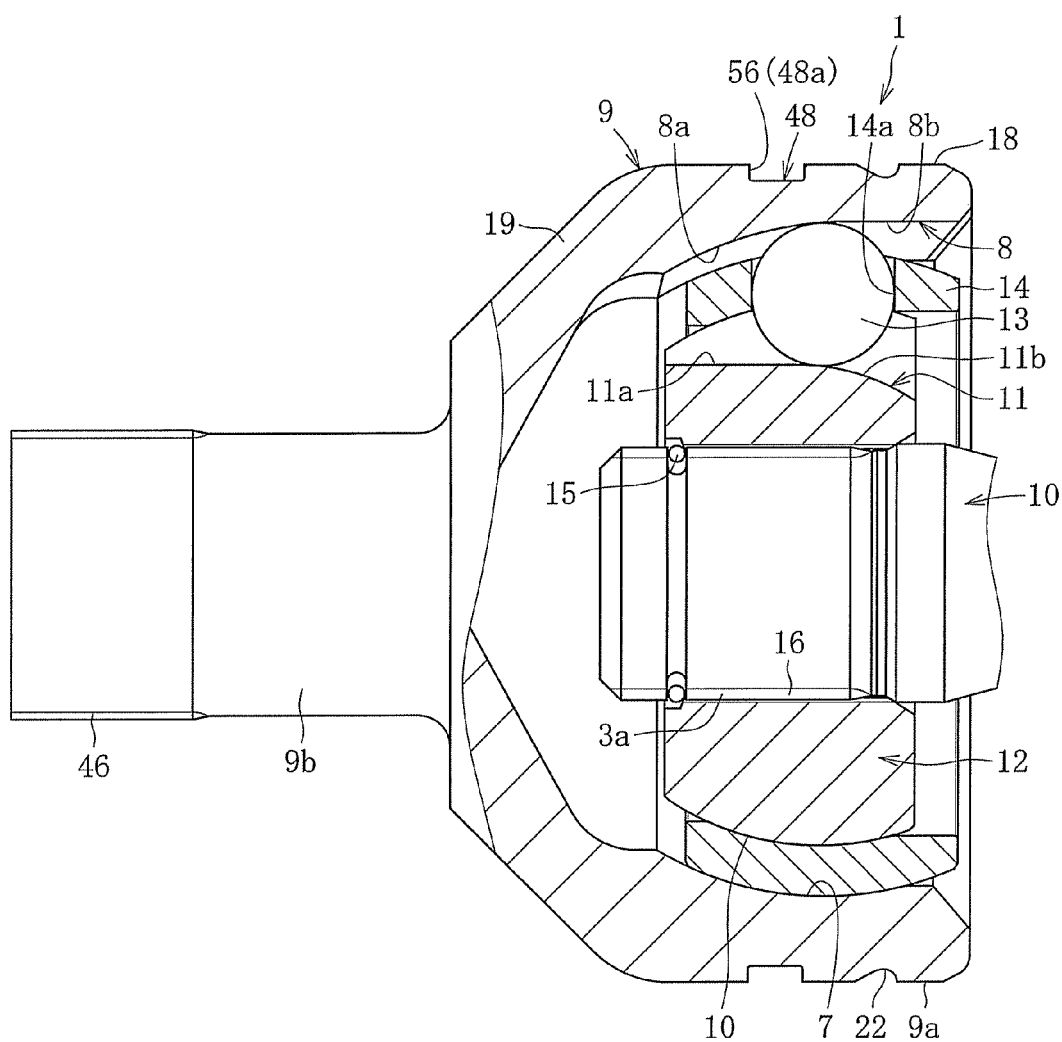
FIG. 2 is a vertical cross-sectional view of an outboard-side constant velocity universal joint.
Figure 3:
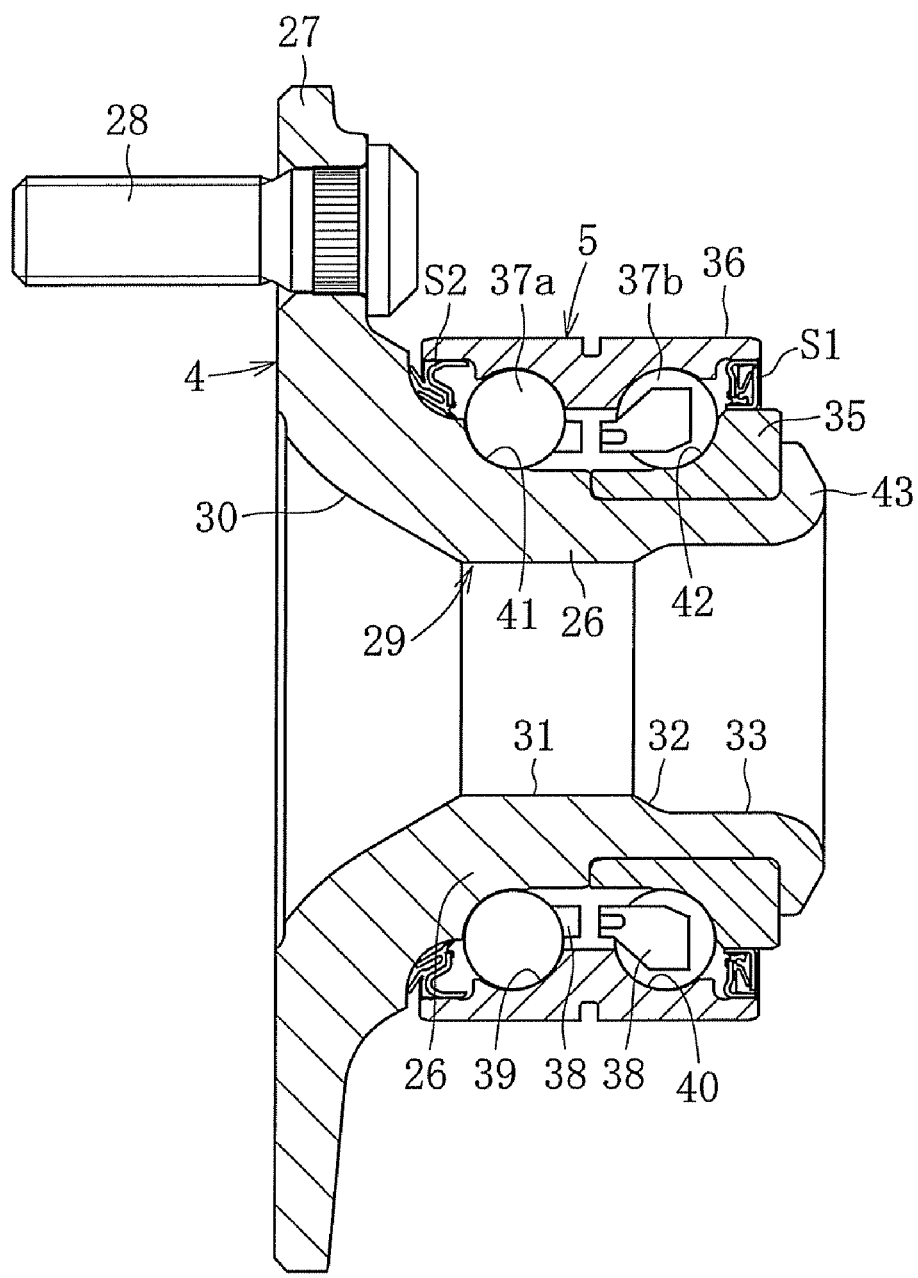
FIG. 3 is a vertical cross-sectional view of an assembled state of a hub and double-row wheel bearing on an outboard side.

The outboard-side constant velocity universal joint 1, as shown in FIG. 2, includes an outer joint member 9, an inner joint member 12, a ball 13, and a cage 14. A plurality of guide grooves 8 are formed on an inner spherical surface 7 of the outer joint member 9, running along the axial direction and evenly spaced in the circumferential direction. A plurality of guide grooves 11 forming pairs with the guide grooves 8 of the outer joint member 9 are formed on an outer spherical surface 10 of the inner joint member 12, running along the axial direction and evenly spaced in the circumferential direction. The ball 13 is a torque transmitting member that transmits torque and is disposed on a track between a guide groove 8 of the outer joint member 9 and a guide groove 11 of the inner joint member 12. The cage 14 is interposed between the inner spherical surface 7 of the outer joint member 9 and the outer spherical surface 10 of the inner joint member 12, and holds the ball 13. Pockets 14a are provided in the cage 14 at a predetermined pitch (such as a 60° pitch) along the circumferential direction. The ball 13 is held in the pocket 14a.

The guide groove 8 of the outer joint member 9 includes a rear guide groove 8a of which a guide groove bottom is a circular arc section, and an opening side guide groove (straight groove) 8b of which the guide groove bottom is a straight section parallel with an outer ring axial line. The guide groove 11 of the inner joint member 12 includes a rear guide groove 11a of which the guide groove bottom is a straight section parallel with the outer ring axial line, and a opening guide groove 11b of which the guide groove bottom is a circular arc section.

A spline section 16 is formed on an inner circumferential surface of a center hole in the inner joint member 12. An end section spline section 3a of the shaft 3 is inserted into the center hole, and the spline section 16 on the inner joint member 12 side and the spline section 3a on the shaft 3 side become engaged. A stopper ring 15 for preventing disengagement is attached to the spline section 16.

The outer joint member 9 includes a mouth section 9a that houses the inner joint member 12, the cage 14, and the torque transmitting ball 13, and a stem shaft 9b that extends integrally from the mouth section 9a in the axial direction. The mouth section 9a includes a large diameter section 18 on an opening side, and a tapered section 19 disposed between the large diameter side 18 and the stem shaft 9b side. As shown in FIG. 1, the opening section of the outer joint member 9 is covered by a boot 20. The boot 20 is configured by a large diameter section 20a, a small diameter section 20b, and a bellows section 20c between the large diameter section 20a and the small diameter section 20b. The large diameter section 20a of the boot 20 is fixed to the outer circumferential surface of the mouth section 9a on the opening side by a boot band 21. The small diameter section 20b of the boot 20 is fixed to an outer circumferential surface of a boot attaching section 3c of the shaft 3 by the boot band 21. A circumferential direction recessing groove 22 (see FIG. 2) is provided on the outer diameter surface of the outer joint member 9 on the opening section side. When the large diameter section 20a is attached to the outer joint member 9 by the boot band 21, a portion of the large diameter section 20a wedges into the circumferential direction recessing groove 22.

The hub 4 is configured by a shaft section 26 and a wheel attaching flange 27 projecting from the shaft section 26. Bolt mounting holes are provided in the wheel attaching flange 27 along the circumferential direction. A hub bolt 28 is inserted into the bolt matching hole. In other words, a brake rotor and a wheel are stacked onto the end surface of the wheel attaching flange 27 and fixed by hub bolts 28. The inner diameter surface of a hole section 29 of the hub 4 includes a tapered surface 30, a small diameter section 31, a small tapered surface 32, and a large diameter section 33. The tapered surface 30 becomes smaller in diameter towards a counter-flange side. The small diameter section 31 continues from the tapered surface 30. The small tapered surface 32 increases in diameter from the small diameter section 31 towards the counter-flange side. The large diameter section 33 continues from the small tapered surface 32.

The wheel bearing 5 includes an inner ring 35, an outer ring 36, an outboard-side rolling element (ball) 37a, an inboard-side rolling element (ball) 37b, and outboard-side and inboard-side retainers 38. The inner ring 35 is fixed such as to be fitted onto the hub 4. The outer ring 36 is disposed such as to surround the hub 4 and the inner ring 35. The rolling element (ball) 37a is interposed between the outer ring 36 and the hub 4. The rolling element (ball) 37b is interposed between the outer ring 36 and the inner ring 35. The retainers 38 have pockets that hold the rolling elements 37a and 37b.

Double-row raceway surfaces (outer races) 39 and 40 are provided on the inner periphery of the outer ring 36. The first outer raceway surface 39 of the outer ring 36 and a first inner raceway surface 41 of the hub 4 oppose each other. The second outer raceway surface 40 of the outer ring 36 and a second inner raceway surface (inner race) 42 of the inner ring 35 oppose each other. The rolling elements (balls) 37a and 37b are interposed between the outer and inner raceways. Sealing members S1 and S2 are press-fitted into the inner circumferential surface of the outer ring 36 on both ends in the axial direction and fixed thereto. In other words, the wheel bearing 5 in this instance includes an outer member including the double-row raceway surfaces 39 and 40 in the inner periphery, an inner member including the double-row raceway surfaces 41 and 42 opposing the raceway surfaces 39 and 40 in the outer periphery and the wheel attaching flange 27 in the outer periphery on the outboard side end, and a double-row of rolling elements 37a and 37b interposed between the raceway surfaces of the outer member and the inner member. The outer member is configured by the outer ring 36. The inner member is configured by hub 4 including the flange 27 and the inner ring 35 press-fitted into the outer periphery of the shaft section of the hub 4 on the inboard-side end. In other words, among the double-row raceway surfaces of the inner member, one row is formed directly in the shaft section 26 of the hub 4 and the other is formed on the inner ring 35 press-fitted into the shaft section 26 of the hub 4.

The counter-flange side end section of the shaft section 26 of the hub 4 is forged into an orbital forming section 43. The inner ring 35 is integrated with the shaft section 26 by the orbital forming section 43. In other words, the joint-side end section of the hub 4 is forged, and the orbital forming section 43 applies preload to the inner ring 35.

The wheel bearing device includes a projection and recess mating structure M that connects the hub 4 and the stem shaft 9b of the outer joint member 9 of the constant velocity universal joint 1 inserted into the hole section 29 of the hub 4. The projection and recess mating structure M includes, for example, a projection provided in the end section of the stem shaft 9b and extending in the axial direction, and a recess formed on the inner diameter surface of the hole section 29 of the hub 4. An overall recess mating area of the projection is in close contact with the corresponding recess. In other words, a plurality of projections is disposed at a predetermined pitch along a circumferential direction on the outer circumferential surface of the stem shaft 9b on the counter-mouth section side. A plurality of recesses with which the projections mate are formed along the circumferential direction on the inner diameter surface of the shaft section fitting hole of the hole section 29 of the hub 4. In other words, the projections and the recesses that mate with the projections are tightly fitted along the overall periphery in the circumferential direction. The projections and the recesses on the other partner member mating with the projections are in close contact over an overall mating contact area 45.

The inboard-side constant velocity universal joint 2 includes an outer joint member 61, a tripod member 62 serving as an inner joint member, and a roller 63 serving as a torque transmitting member, as the main constituent elements.

The outer joint member 61 includes integrally formed mouth section 61a and stem section 62b. The mouth section 61a is open on one end and is cup-shaped. Guide grooves 66 extending in the axial direction are formed on the inner circumference in trisecting positions in the circumferential direction. A roller guide surface 67 is formed on a side wall facing each guide groove 66 in the circumferential direction.

The tripod member 62 includes a boss 68 and a support shaft 69. A spline hole 68a that is connected to an end section spline 3b of the shaft 3 to allow torque transmission is formed in the boss 68. The support shaft 69 projects in a radial direction from the trisecting positions in the circumferential direction of the boss 68. Each support shaft 69 of the tripod member 62 holds a roller 63.

An opening section of the outer joint member 61 is sealed by a boot 70. The boot 70 includes a large diameter section 70a, a small diameter section 70b, and a bellows section 70c between the large diameter section 70a and the small diameter section 70b. The large diameter section 70a of the boot 70 is fixed to the outer circumferential surface of the mouth section 61a on the opening side by a boot band 71. The small diameter section 70b of the boot 70 is fixed to the outer circumferential surface of a boot attaching section 3d of the shaft 3 by the boot band 71.

Next, a mating method of the projection and recess mating structure M in the outboard-side wheel bearing device will be described. In this instance, a hardened layer is formed over the entire periphery of the outer diameter section of the stem shaft 9b by high-frequency hardening and the like. A spline 46 serving as a projection and recess section is formed on the mating area (intermediate area of the stem shaft 9b in the axial direction) along the circumferential direction. Therefore, projections of the spline 46 are hardened, and the projections serve as the projections in the projection and recess mating structure M. The inner diameter surface of the hub 4 is not hardened. Therefore, the mating area (namely the spline) side is harder than a mated area (namely the inner diameter surface of the small diameter section 31 of the hub 4) side.

Then, the stem shaft 9b is press-fitted into the hub 4 from the counter-flange side. At this time, because the spline 46 of the stem shaft 9b is hardened and the inner diameter surface of the hub 4 is a raw material that has not been hardened, the shape of the spline 46 of the stem shaft 9b is transferred onto the inner diameter surface of the hub 4. In other words, when the stem shaft 9b is press-fitted into the hole section 29 of the hub 4, the projections wedge into the inner diameter surface of the hole section 29 (small diameter section 31) of the hub 4. The projections form the recesses that mate with the projections, along the axial direction. As a result, the hub 4 and the stem shaft 9b are integrally connected. In other words, during press-fitting of the projections of the spline 46, the shaft section 26 of the hub 4 becomes elastically deformed in the radial direction. Preload of an amount equivalent to the elastic deformation is applied to the tooth flank of the projections. Therefore, the overall mating contact areas of the projections of the spline 46 and the recesses of the hub 4 that mate with the projections are in close contact.

As a result, the hub 4 and the stem shaft 9b of the outer joint member 9 of the constant velocity universal joint 1 can be connected by the projection and recess mating structure M. The orbital forming section 43 of the hub 4 and the bottom surface of the mouth section 9a of the outer joint member 9 face each other with a predetermined distance therebetween in FIG. 1. However, the orbital forming section 43 and the bottom surface of the mouth section 9a of the outer joint member 9 can be in contact with each other. Contact surface pressure in this instance is preferably 100 MPa or lower.

Figure 4:
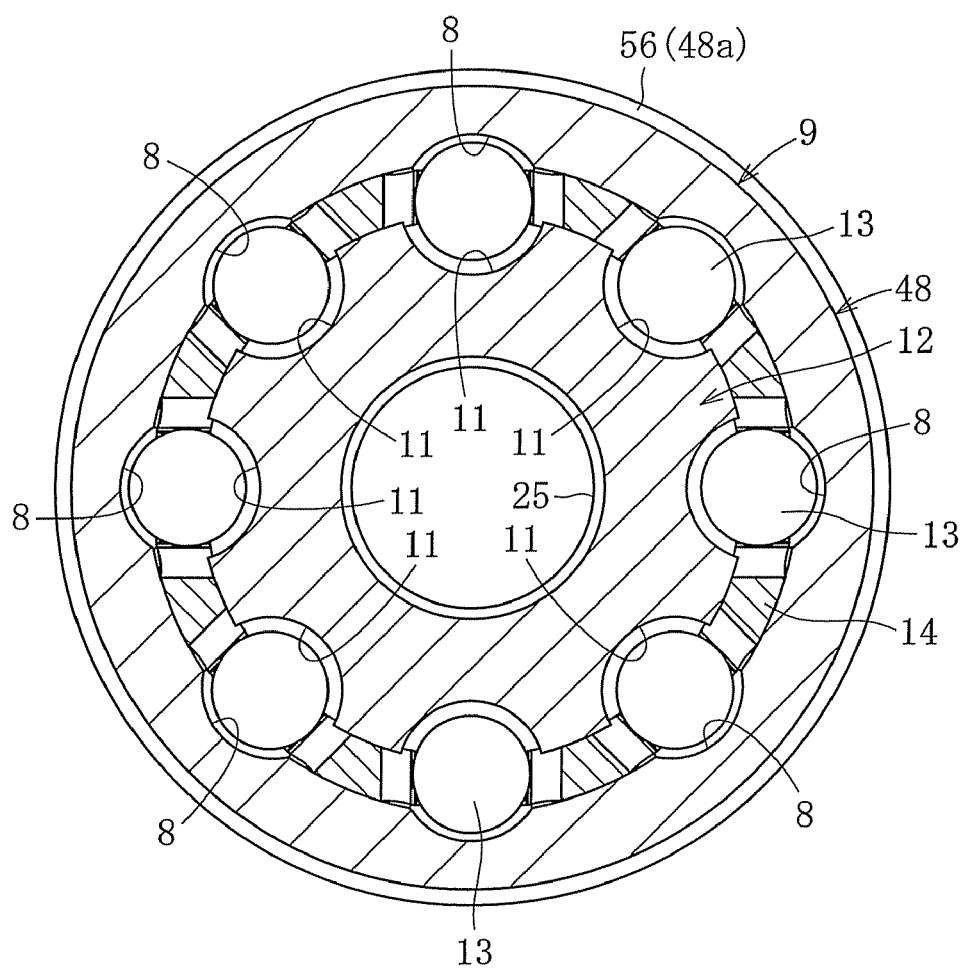
FIG. 4 is an enlarged horizontal cross-sectional view of the outboard-side constant velocity universal joint.
Figure 6:
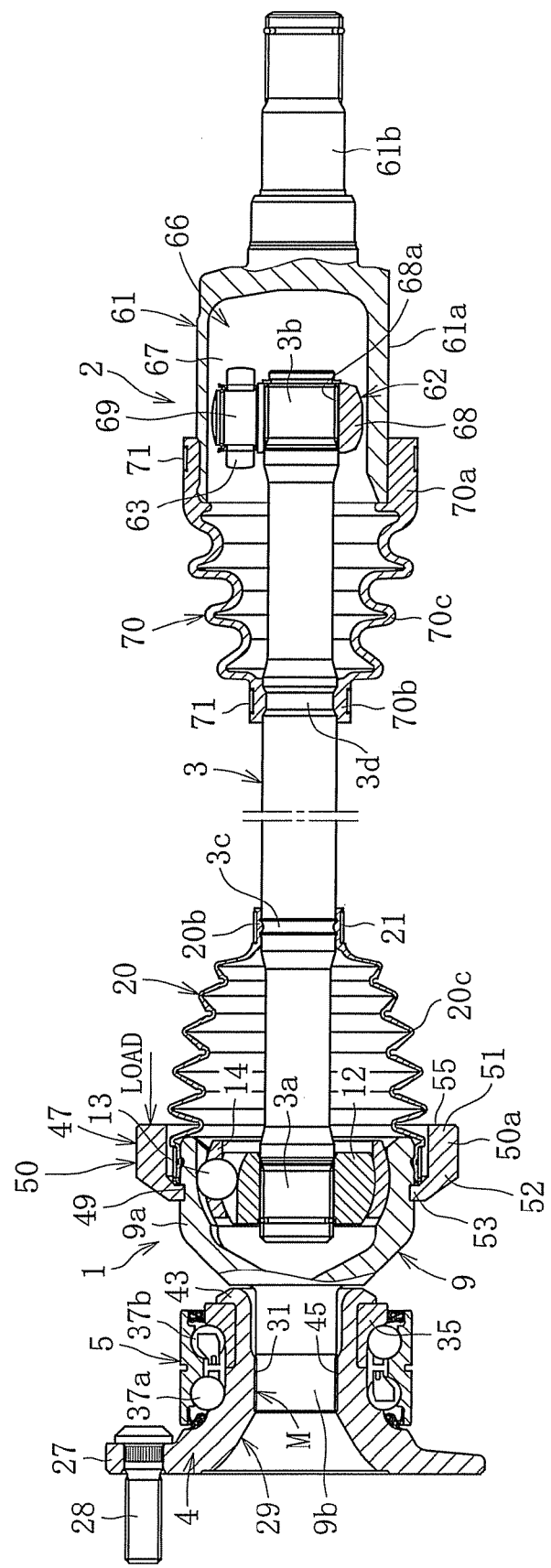
FIG. 6 is a cross-sectional view of a method of press-fitting an outer joint member of a constant velocity universal joint into a hub.

When the stem shaft 9b is press-fitted into the hub 4 from the counter-flange side, a press-fitting jig 47, such as that shown in FIG. 6, is used. A recessing groove 48 that engages with the press-fitting jig 47 is provided on the outer diameter surface (mouth section 9a) of the outer joint member 9. The recessing groove 48 in this instance is provided along the circumferential direction as shown in FIG. 4.

The press-fitting jig 47 is configured by a ring-shaped body 50 formed using a split mold. In other words, the ring-shaped body 50 is made of a plurality of segments 50a (at least two segments). The ring shape is formed by the segments 50a being combined. The ring-shaped body 50 formed by the segments 50a being combined into a ring shape includes a main ring section 51, a tapered section 52 continuing from the main ring section 51, and an inner shoulder section 53 that projects from the tapered section 52 to the inner diameter side.

The inner diameter of the main ring section 51 of the ring-shaped body 50 is set to be greater than the outer diameter of the large diameter section 20a including the boot band 21 of the boot 20. In a state in which the ring-shaped body 50 is fitted onto the outer joint member 9, the inner shoulder section 53 fits into the recessing groove 48 of the outer joint member 9. Therefore, as a result of load (pressing force) being applied in an arrow A direction (axial direction) in FIG. 6 to the end surface 55 of the ring-shaped body 50, the load can be applied to the outer joint member 9 via the inner shoulder section 53 engaged with the recessing groove 48. The stem shaft 9b of the outer joint member 9 can be press-fitted into the hole section 29 of the hub 4.

In this way, in the assembly of the wheel bearing device, axial direction load (press-fitting load) can be applied to a stepped surface 56 that is a side surface (radial direction end surface) 48a of the recessing groove 48 on the stem shaft side. An axial direction pressing-force application area can be secured. In addition, because the stepped surface 56 provided on the outer diameter surface of the outer joint member 9 is pressed, compared to when the opening end surface of the outer joint member 9 and the like is pressed, the vicinity of the stem shaft 9b of the outer joint member 9 that is the press-fitting shaft can be pressed, thereby allowing a stable press-fitting operation. The application of axial direction load onto the end surface 55 of the press-fitting jig 47 can be performed using various axial direction reciprocating mechanisms, such as a press mechanism, a cylinder mechanism, or a ball screw mechanism.

In addition, because the wheel bearing device assembled in this way includes the projection and recess mating structure M that integrally connects the hub 4 and the stem shaft 9b of the outer joint member 9 of the constant velocity universal joint 1 fitted into the hole section of the hub 4, backlash in the circumferential direction of the projection and recess mating structure M can be eliminated. In addition, a nut tightening operation is not required to connect the stem shaft 9b and the hub 4. Therefore, the assembly operation can be facilitated, cost of the assembly operation can be reduced, and weight reduction can be achieved.

When the bottom surface of the mouth section 9a and the hub 4 are not in contact, noise caused by contact between the mouth section 9a and the hub 4 can be prevented. Because the end section of the hub 4 is forged and preload is applied to the inner ring 35 of the wheel bearing 5, preload is not required to be applied to the inner ring 35 by the mouth section 9a of the outer joint member 9. Therefore, the stem shaft 9b of the outer joint member 9 can be press-fitted without the pre-load applied to the inner ring 35 being taken into consideration. Connectability (assembly) of the hub 4 and the outer joint member 9 can be enhanced. When the bottom surface of the mouth section 9a is in contact with the orbital forming section 43 of the hub 4, flexural rigidity in the stem shaft direction improves. The wheel bearing device becomes stronger against bending. A high quality product having excellent durability can be achieved. In addition, positioning during press-fitting can be actualized by the contact between the bottom surface of the mouth section 9a and the orbital forming section 43 of the hub 4. As a result, dimensional accuracy of the wheel bearing device can be stabilized. In addition, an axial direction length of the projection and recess mating structure M disposed along the axial direction can be ensured to be a stable length. Torque transmission can be enhanced. When the contact surface pressure between the orbital forming section 43 of the hub 4 and the bottom surface of the mouth section 9a exceeds 100 MPa, abnormal noise may occur. In other words, a difference in torsion amounts occurs between the outer joint member 9 of the constant velocity universal joint 1 and the hub 4 when a large torque load is applied. As a result of the difference, a sudden slippage occurs at the contact section between the bottom surface of the mouth section 9a and the orbital forming section 43 of the hub 4, and abnormal noise occurs. On the other hand, when the contact surface pressure is 100 MPa or less, sudden slippage can be prevented, and abnormal noise can be suppressed.

Figure 5:
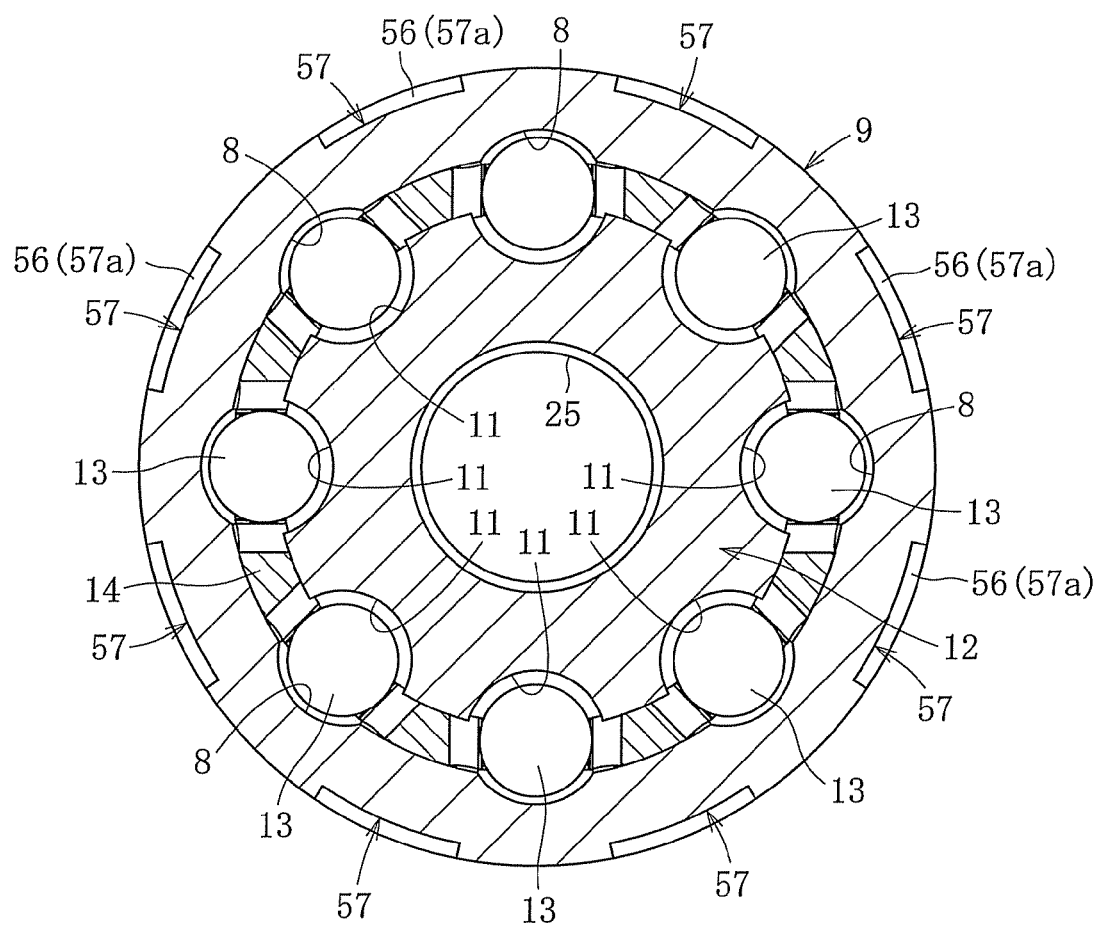
FIG. 5 is an enlarged horizontal cross-sectional view of a variation example of the outboard-side constant velocity universal joint.

As shown in FIG. 5, notched sections 57 having a rectangular cross-sectional shape are provided on the outer diameter surface of the outer joint member 9 at a predetermined pitch (such as a 45° pitch) along the circumferential direction. The stepped surface 56 configuring the axial direction pressing force application area can be formed by a side surface 57a of the notched section 57 on the stem shaft side.

As shown in FIG. 5, when the stepped surface 56 is configured by the side surface 57a of the notched section 57 on the stem shaft side, the press-fitting jig 47 to be used can be configured such that only a plurality of inner shoulder sections 53 are provided such as to project from the small diameter end section of the tapered section 52 at a pitch corresponding to the placement pitch of the notched sections 57, rather then the inner shoulder section 53 being provided along the overall circumference in the circumferential direction.

Therefore, even in the outer joint member 9 such as that shown in FIG. 5, the axial direction load (press-fitting load) can be applied to the stepped surface 56 that is the side surface 57a of the notched section 57 on the stem shaft side using the press-fitting jig 47. The axial direction pressing force application area can be secured, and a stable press-fitting operation can be performed.

Figure 7:
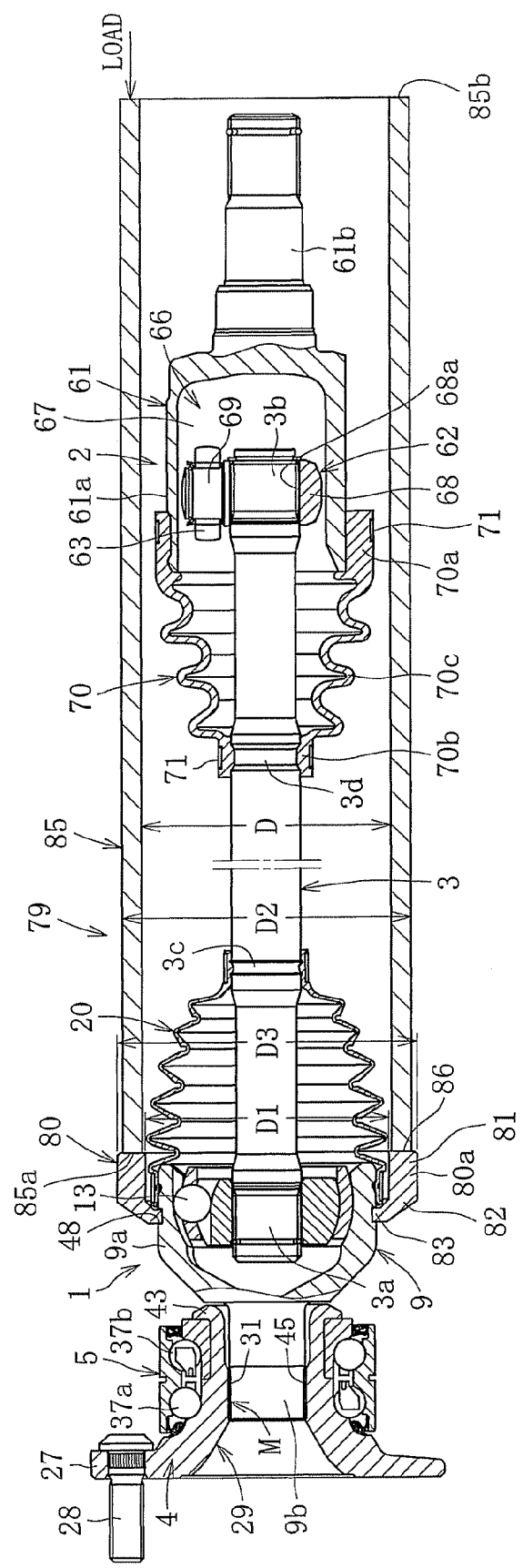
FIG. 7 is a cross-sectional view of another method of press-fitting an outer joint member of a constant velocity universal joint into a hub.

As shown in FIG. 7, in a drive shaft in which the outboard-side constant velocity universal joint 1 and the inboard-side constant velocity universal joint 2 are assembled to the shaft 3, the stem shaft 9b on the outboard side is press-fitted into the hub 4 using a press-fitting jig 79 such as that shown in FIG. 7.

The press-fitting jig 79 is configured by a ring-shaped body 80 and a pipe body 85. The ring-shaped body 80 is formed using a split mold and applies the axial direction load by directly contacting the stepped surface 56 provided on the outer diameter surface of the outer joint member 9. The pipe body 85 houses both constant velocity universal joints during press-fitting. In a manner similar to the ring-shaped body 50 of the press-fitting jig 47, the ring-shaped body 80 is made of a plurality of segments 80a (at least two segments). The ring shape is formed by the segments 80a being combined. As shown in FIG. 7, the ring-shaped body 80 configured by the segments 80a being combined to form the ring shape includes a main ring section 81, a tapered section 82 that continues from the main ring section 81, and a inner shoulder section 83 that projects from the tapered section 82 towards the inner diameter side.

An inner diameter dimension D of the pipe body 85 is set to be greater than the outer diameter dimensions of the outboard-side constant velocity universal joint 1 and the inboard-side constant velocity universal joint 2. The outer diameter dimension of the constant velocity universal joints 1 and 2 is a maximum outer diameter including the boots 20 and 70, and the boot bands 21 and 71. The inner diameter dimension D is also set to be greater than an inner diameter dimension D1 of the ring-shaped body 80. An outer diameter dimension D2 of the pipe body 85 is set to be smaller than an outer diameter D3 of the ring-shaped body.

When the ring-shaped body 80 is fitted onto the outboard-side outer joint member 9, the inner shoulder section 83 is engaged with the recessing groove 48. In this state, the drive shaft is inserted into the pipe body 85. At this time, one end surface 85a of the pipe body 85 is in contact with an end surface 86 of the ring-shaped body 80. The other end surface (pipe body outer end surface) 85b of the pipe body 85 projects further outward in the axial direction than the inboard-side constant velocity universal joint 2.

Therefore, as shown in FIG. 7, when the press-fitting jig 79 configured by the ring-shaped body 80 and the pipe body 85 is used, the axial direction load is applied to the pipe body outer end surface 85b. The pressing force can be stably applied without position control of the drive shaft within the pipe body being performed. In other words, during press-fitting, even when the shaft 3 and the like of the drive shaft within the pipe body 85 shifts from the axial center of the pipe body 85, the pressing force can be stably applied.

Figure 8:
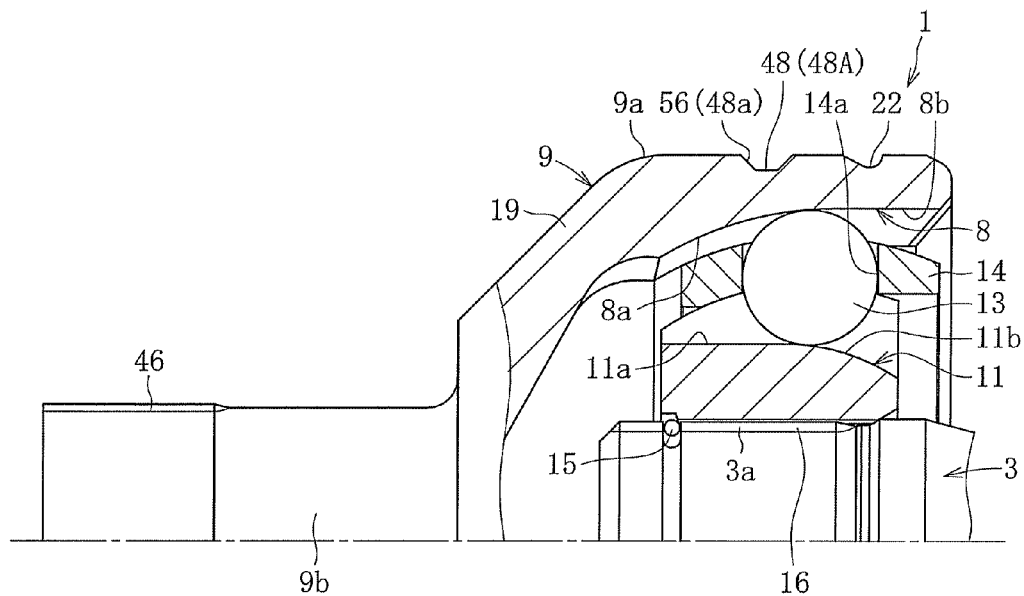
FIG. 8 is a vertical cross-sectional view of an outer joint member of a constant velocity universal joint according to another embodiment.

As shown in FIG. 8, the recessing groove 48 for configuring the stepped surface 56 can be a recessing groove 48A that has an inverted trapezoidal cross-sectional shape. In this instance as well, a side surface 48a on the stem shaft side configures the stepped surface 56. As shown in FIG. 5, when the stepped surface 56 is configured by the notched sections 57 formed along the circumferential direction at a predetermined pitch, the cross-sectional shape of the notched sections 57 can be an inverted trapezoid such as that shown in FIG. 8. In this way, even when the stepped surface 56 is a surface at an angle to the planar surface perpendicular to the axial center line of the outer joint member 9, the press-fitting force from the stem shaft 9b to the hole section 29 of the hub 4 can be applied.

A projection 87 can be provided on the outer diameter surface of the outer joint member 9, and the stepped surface 56 can be configured by a radial direction end surface 87a of the projection 87. In this instance as well, the axial direction pressing force can be applied to the stepped surface 56 via the inner shoulder sections 53 and 83 of the ring-shaped bodies 50 and 80. The projection 87 can be formed over the entire circumference of the outer diameter surface of the outer joint member 9. Alternatively, a plurality of projections 87 can be provided along the circumferential direction at a predetermined pitch. Therefore, the ring-shaped bodies 50 and 80 to be used can be those in which the inner shoulder sections 53 and 83 are formed over the entire circumference or a plurality of inner shoulder sections 53 and 83 are provided along the circumferential direction at a predetermined pitch.

Figure 10:
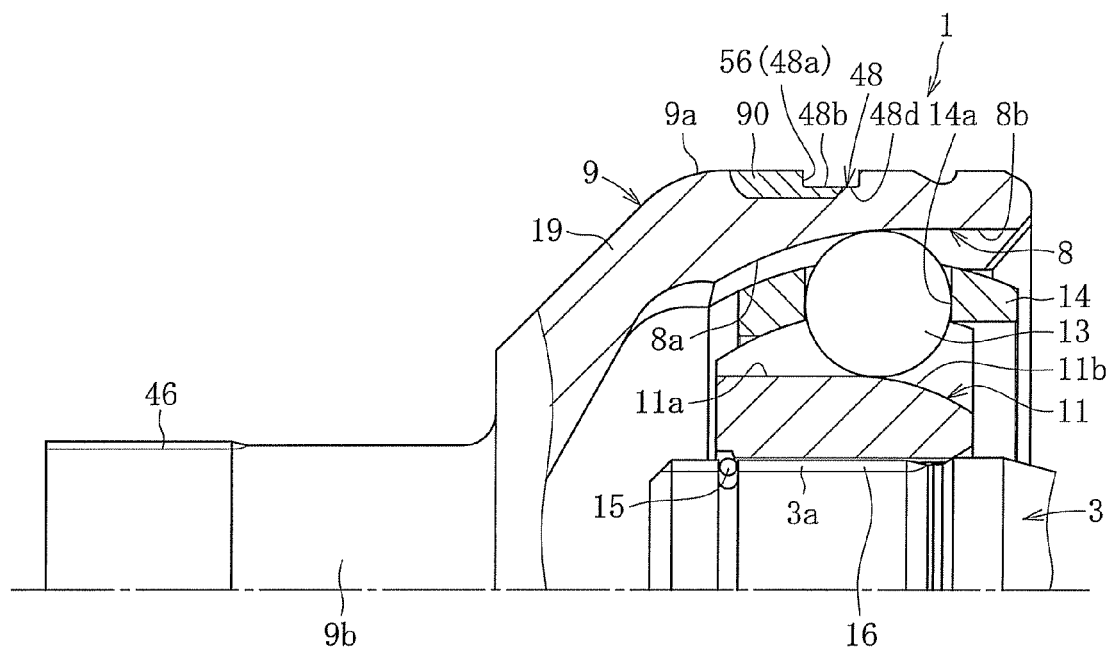
FIG. 10 is a vertical cross-sectional view of an outer joint member of a constant velocity universal joint according to still another embodiment.
Figure 11:
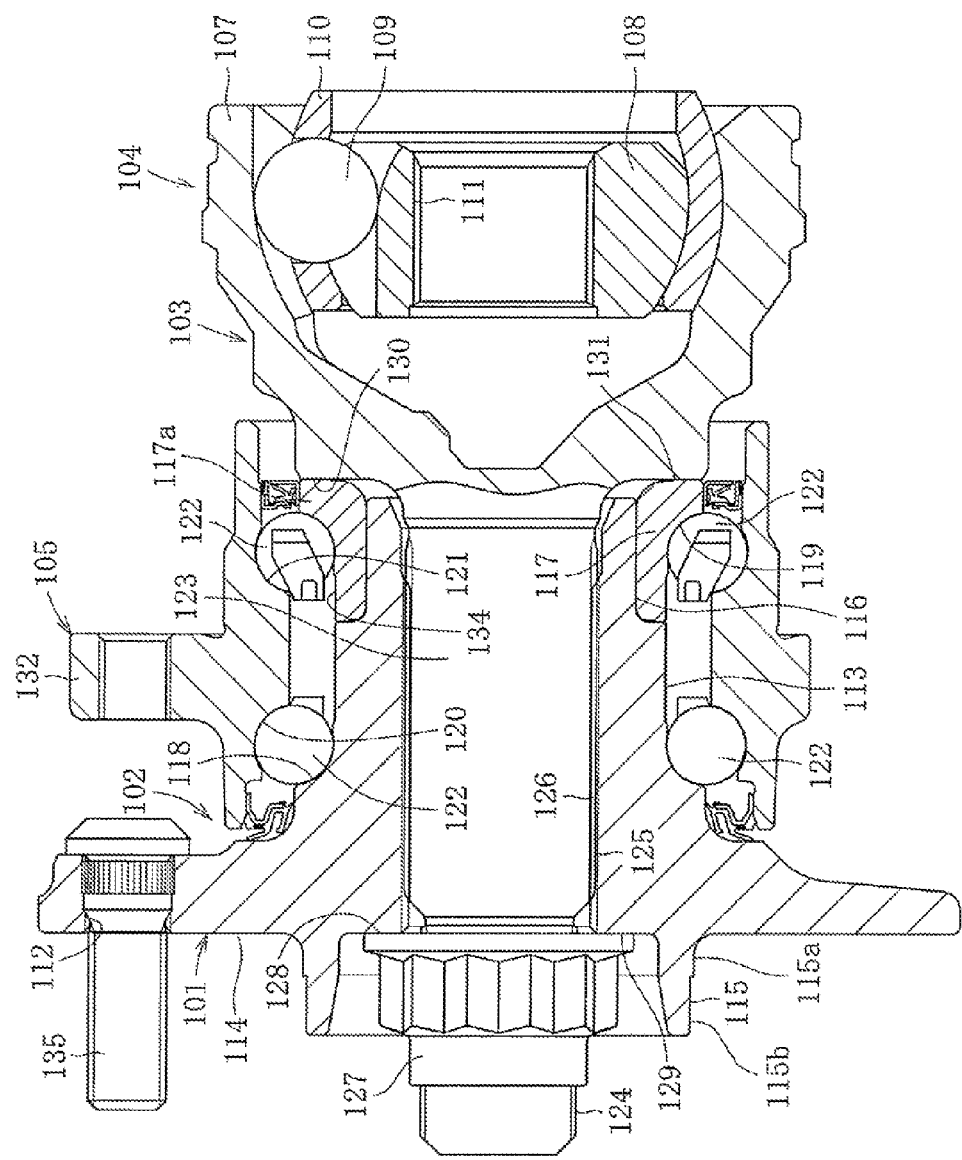
FIG. 11 is a cross-sectional view of a conventional method of connecting a hub and an outer joint member of a constant velocity universal joint.

When the stepped surface 56 is provided, as shown in FIG. 10, a hardened section 90 formed by a hardening process is preferably provided on and near the stepped surface 56 Various thermoset processes, such as high-frequency hardening and carburization, can be performed on the hardened section 90. High-frequency hardening is a heat treatment in which a steel surface is heated by electrical induction and hardened by quenching. Carburization is a heat treatment in which a low-carbon steel surface is permeated with carbon and formed into high-carbon steel. The high-carbon steel is then quenched, and the surface is hardened. In addition, a process (tempering) for providing toughness by tempering can be performed on the hardened section 90 after quenching.

In this way, as a result of the hardening process, the stepped surface 56 and its vicinity can be hardened. Load-tolerance is enhanced, and the stepped surface is stabilized in terms of strength. The hardened section 90 in FIG. 10 is formed over a range from an intermediate portion of the bottom surface 48b of the recessing groove 48 in the axial direction to a rear side of the side surface 48a (stem shaft side). However, this is not limited thereto. In other words, the hardened section 90 can be formed on the side surface 48d side of the recessing section 48 on the counter-stem shaft side. Alternatively, the hardened section 90 can be formed over the overall outer diameter surface of the mouth section 9a of the outer joint member 9.

According to the embodiment, the hub 4 and the stem shaft 9b of the outer joint member 9 of the constant velocity universal joint 1 are integrally connected by the projection and recess mating structure M. In other words, in this connected state, the configuration is such that load applied in an ordinary usage state does not cause the stem shaft 9b to be pulled out of the hub 4 or the stem shaft 9b to become misaligned with the hub 4.

However, the mating force of the projection and recess mating structure M can be set such that the stem shaft 9b can be pulled out of the hub 4 by a pulling force that is a predetermined force (a pulling force that is not applied during ordinary use) or more being applied to the outer joint member 9.

The pulling force can be applied via a stepped surface provided on the outer diameter surface (outer diameter surface of the mouth section 9a) of the outer joint member 9. Alternatively the pulling force can be applied via the end surface of the stem shaft 9b of the outer joint member 9 and the like, without a stepped surface such as this being separately provided. The stepped surface used to apply the pulling force can be a radial direction end surface (counter-stem shaft side end surface) of the recessing groove on the outer diameter surface of the outer joint member 9, or a radial direction end surface (stem shaft side end surface) of the projection on the outer diameter surface of the outer joint member 9. In other words, the recessing groove, the notched section, the projection, and the like used for press-fitting can be used.

In this way, when the outer joint member 9 can be detached from the hub 4 through application of the pulling force in the axial direction, workability of repair and inspection of each component (maintenance) can be enhanced. In addition, the projection and recess mating structure M can be configured again by the stem shaft 9b of the outer joint member 9 being press-fitted into the hub 4 again after repair and inspection of each component. Therefore, a wheel bearing device that can stably transmit torque can be configured again. The recessing groove and the projection forming the stepped surface used for press-fitting can be used as the stepped surface for application of the pulling force. Therefore, the configuration can be simplified.

In the initial press-fitting operation, a press or the like is required to be used for press-fitting because the press-fitting load is relatively large. On the other hand, the press or the like is not require to be used for subsequent press-fitting operations because the press-fitting load is less than the press-fitting load of the initial press-fitting operation. The stem shaft 9b can be press-fitted into the hub 4 stably and accurately. Therefore, the outer joint member 9 and the hub 4 can be detached and attached on site.

Figure 12:
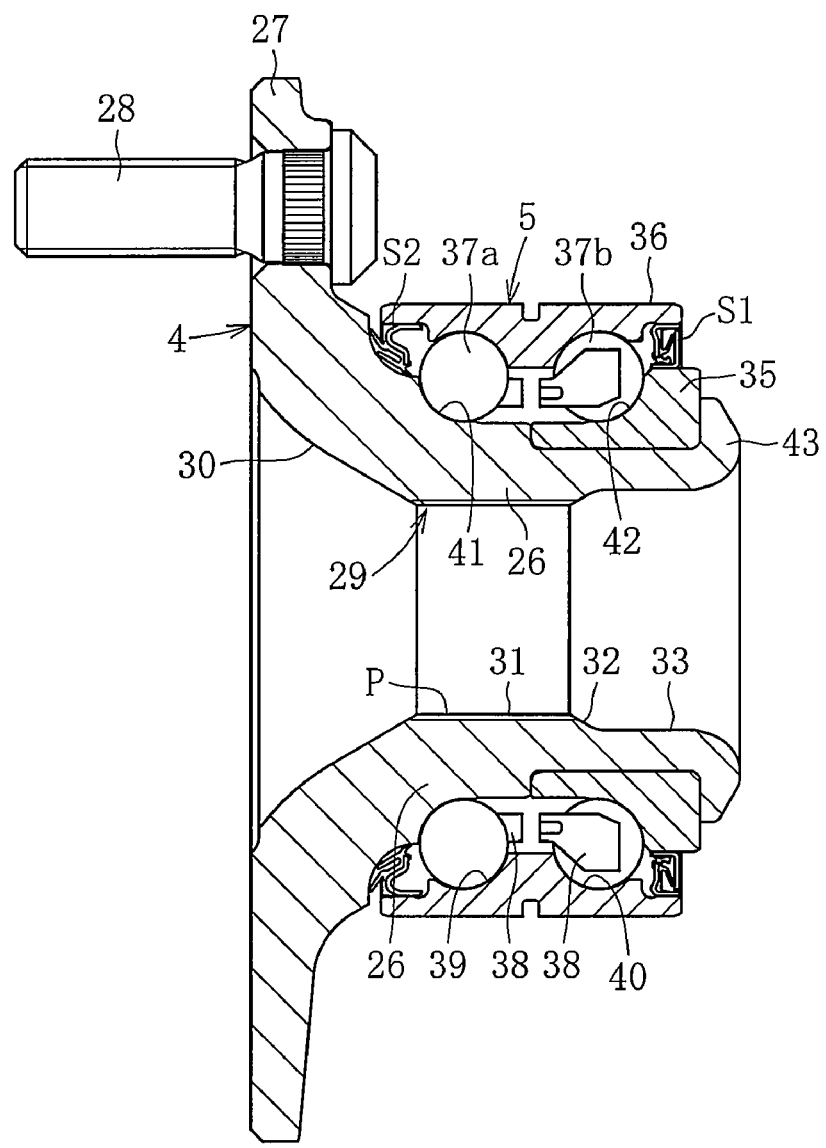
FIG. 12 is a vertical cross-sectional view of an assembled state of a hub and double-row wheel bearing on an outboard side according to another embodiment.

According to another embodiment, as shown in FIG. 12, the projection and recess mating structure M can be configured by projections P being provided on the inner diameter surface of the hole section 29 of the hub 4 and recesses that mate in close contact with the projections being provided on the outer diameter surface of the stem shaft 9b. In this instance, hardened projections P are formed on the inner diameter surface of the hole section 29 of the hub 4. The stem shaft 9b is not hardened. The stem shaft 9b is press-fitted into the hole section 29 of the hub 4.

In other words, the projections of the projection and recess mating structure M are provided on the inner diameter surface of the hole section 28 of the hub 4. The hardness of at least the axial direction end section of the projections is higher than that of the outer diameter section of the stem shaft 9b of the outer joint member 9. The projections on the hub 4 side are press-fitted onto the stem shaft 9b from the axial direction end section side. As a result, the recesses that mate in close contact with the projection can be formed on the outer diameter surface of the stem shaft 9b by the projection, and the projection and recess mating structure M can be configured. For example, the projections on the hole section 28 of the hub 4 can be configured by a spline being formed on the inner diameter surface of the hole section 28 of the hub 4.

Even when the projections of the projection and recess mating structure M are formed on the hub 4 side, because press-fitting is relative between the hub 4 and the stem shaft 9b, press-fitting and detachment can be performed using the stepped surface 56.

In this way, in the invention, the projections formed on one of the outer diameter surface of the stem shaft 9b of the outer joint member 9 and the inner diameter surface of the hole section 29 of the hub 4 are press-fitted into the other along the axial direction, thereby forming the recesses that mate in close contact with the projections. As a result, the projection and recess mating structure M can be configured with certainty. Moreover, a spline section or the like is not required to be formed in the member in which the recesses are formed, and productivity is high. In addition, because phase alignment between splines is not required to be performed, assembly can be enhanced. Damage to tooth flanks during press-fitting can be prevented, and a stable mating state can be maintained.

In addition, when the projections of the projection and recess mating structure M are provided on the stem shaft 9b of the outer joint member 9, the hardness of the projections in the axial direction end section is higher than that of the inner diameter section of the hole section 29 of the hub 4, and the stem shaft 9b is press-fitted into the hole section 29 of the hub 4 from the axial direction end section side of the projections, the hardness of the stem shaft 9b side can be increased and rigidity of the stem shaft 9b can be enhanced. On the other hand, when the projections of the projection and recess mating structure M are provided on the inner diameter surface of the hole section 29 of the hub 4, the hardness of the projections in the axial direction end section is higher than that of the outer diameter section of the stem shaft 9b of the outer joint member 9, and the projections on the hub 4 side are press-fitted onto the stem shaft 9b of the outer joint member 9 from the axial direction end section side of the projections, productivity of the outer joint member 9 of the constant velocity universal joint is high because the hardening process (heat treatment) is not required to be performed on the stem shaft 9b side.

Embodiments of the present invention are as described above. However, the present invention is not limited to the embodiments. Various modifications can be made. For example, various shapes, such as a triangular cross-sectional shape, a trapezoidal cross-sectional shape, a semi-circular shape, a semi-elliptical shape, or a rectangular shape can be used as the shape of the projections of the projection and recess mating structure M. The area, the number, the circumferential direction placement pitch, and the like of the projections can be arbitrarily changed. In addition, the projections of the projection and recess mating structure M are not required to be the projections in a spline. A key-like configuration can also be used. Alternatively, a curved, wave-shaped mating surface can be formed. All that is required is that projections disposed along the axial direction can be press-fitted into the partner member, recesses mating in close contact with the projections can be formed in the partner member by the projections, and overall mating contact areas of the projections and the corresponding recesses are in close contact.

The small diameter section 31 of the hole section 29 of the hub 4 can be an irregularly shaped hole, such as a polygonal hole, in addition to a circular hole. The cross-sectional shape of the stem shaft 9b fitted into the small diameter section 31 can be an irregular cross-sectional shape, such as a polygonal shape, in addition to the circular shape.

Figure 9:
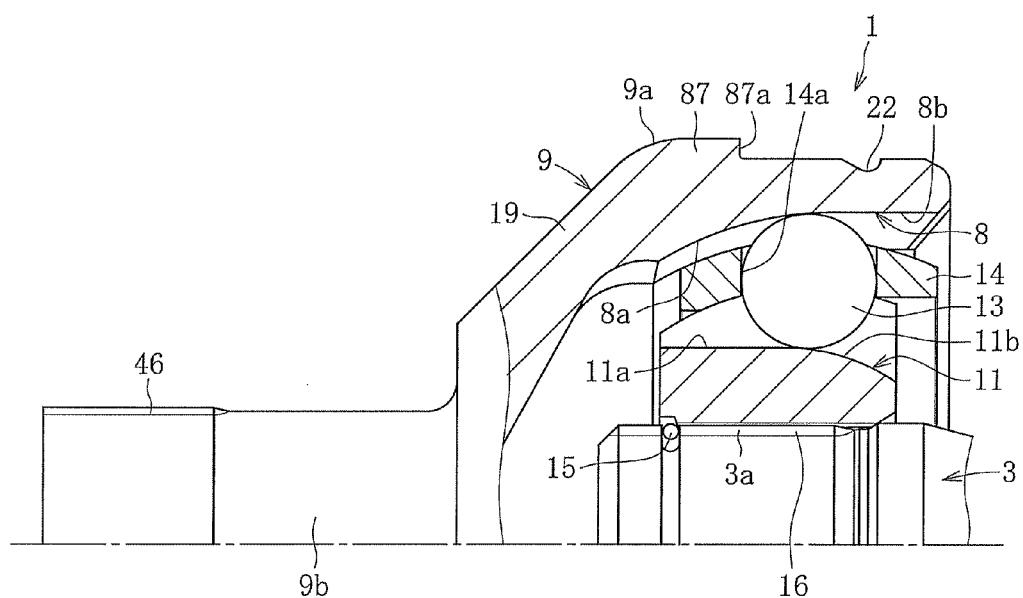
FIG. 9 is a vertical cross-sectional view of an outer joint member of a constant velocity universal joint according to a different embodiment.

The hardened section 90 can be provided in the outer joint member 9 shown in FIG. 8 and in the outer joint member shown in FIG. 9. The recessing groove for boot attachment provided on the opening section side of the outer diameter surface of the mouth 9a and the like can be used as the stepped surface used for press-fitting and the stepped surface used for detachment, without providing a separate recessing groove or projection. The constant velocity universal joint 1 according to the embodiments is an undercut-free type fixed constant velocity universal joint (UJ). However, a Birfield type fixed constant velocity universal joint (BJ) that does not have a straight section in the guide groove bottom and the like can also be used. In addition, the constant velocity universal joint 2 according to the embodiment is a tripod-type sliding constant velocity universal joint. However, a double-offset type constant velocity universal joint (DOJ), or a cross-groove type or other types of sliding constant velocity universal joints can also be used.

The present application can be applied to a first generation wheel bearing device configured such that a double-row wheel bearing is used alone, a second generation wheel bearing device in which a vehicle attachment flange is integrally formed with an outer member, a third generation wheel bearing device in which one inner raceway surface of a double-row wheel bearing is integrally formed on an outer circumference of a hub that integrally includes a wheel attaching flange, and a fourth generation wheel bearing device in which a constant velocity universal joint is integrally connected to the hub, and the other inner raceway surface of the double-row wheel bearing is integrally formed on an outer circumference of the outer joint member configuring the constant velocity universal joint.

The invention claimed is:

1. A wheel bearing device comprising:
an outer member having double row raceway surfaces on an inner periphery;
an inner member having double row raceway surfaces opposing the double row raceway surfaces of the outer member, a wheel attaching flange on an outer periphery on an out-board side end, and double row rolling elements interposed between the raceway surfaces of the outer member and the raceway surfaces of the inner member; and
an outer joint member including a stem and a stem shaft section,
wherein the inner member is configured by a hub having the flange and an inner ring press-fitted onto a shaft section of the hub, and the stem shaft section of the outer joint member is fitted into the hole section of the hub so as to be integrated with the hub by a projection and recess mating structure,
wherein the outer joint member has a stepped surface and a groove configured to enable a boot to be attached therein,
the stepped surface and the groove are disposed on an outer diameter surface of the outer joint member; and
the stepped surface is disposed on the outer diameter surface of the outer joint member so as to be closer to the out-board side than the groove, and
wherein the projection and recess mating structure is configured by a projection extending in an axial direction and being disposed on one of the stem shaft section of the outer joint member and an inner diameter surface of the hole section of the hub, and being press-fitted into the other of the stem shaft section of the outer joint member and an inner diameter surface of the hole section of the hub by an axial direction load being applied onto the stepped surface, such that the projection forms a recess that mates in close contact with the projection disposed on the one of the stem shaft section of the outer joint member and the inner diameter surface of the hole section of the hub.

2. The wheel bearing device according to claim 1, wherein among the double row raceways of the inner member, one row is directly disposed in the shaft section of the hub and the other row is disposed in the inner ring press-fitted onto the shaft section of the hub.

3. The wheel bearing device according to claim 1, wherein a recessing groove is disposed on the outer diameter surface of the outer joint member, and a radial direction end surface of the recessing groove configures the stepped surface.

4. The wheel bearing device according to claim 1, wherein a projection is disposed on the outer diameter surface of the outer joint member, and a radial direction end surface of the projection configures the stepped surface.

5. The wheel bearing device according to claim 1, wherein a hardening process is performed on and adjacent the stepped surface.

6. An assembly, wherein the wheel bearing device according to claim 1 is configured by an outboard-side constant velocity universal joint, the outboard-side constant velocity universal joint being disposed in a drive shaft including the outboard-side constant velocity universal joint, an inboard-side constant velocity universal joint, a shaft connecting between the constant velocity universal joints, and boots attached to the constant velocity universal joints.

7. The wheel bearing device according to claim 1, wherein the stepped surface is configured to engage an inner shoulder section of a ring-shaped body.

8. A wheel bearing device comprising:
an outer member having double row raceway surfaces on an inner periphery;
an inner member having double row raceway surfaces opposing the raceway surfaces on the inner periphery of the outer member, a wheel attaching flange on an outer periphery on an out-board side end, and double row rolling elements interposed between the raceway surfaces of the outer member and the inner member; and
an outer joint member having a stem shaft section and a shaft,
wherein the inner member is configured by a hub having the flange and an inner ring that is press-fitted onto a shaft section of the hub, and the stem shaft section of the outer joint member is fitted into a hole section of the hub so as to be integrated with the hub by a projection and recess mating structure,
wherein the outer joint member has a stepped surface and a groove configured to enable a boot to be attached therein,
the stepped surface and the groove are disposed on an outer diameter surface of the outer joint member, and
the stepped surface is disposed on the outer diameter surface of the outer joint member so as to be closer to the out-board side than the groove,
wherein the projection and recess mating structure is configured by a projection extending in an axial direction and being disposed on one of the stem shaft section of the outer joint member and an inner diameter surface of the hole section of the hub, and being press-fitted into the other of the stem shaft section of the outer joint member and an inner diameter surface of the hole section of the hub by an axial direction load being applied onto the stepped surface, such that the projection forms a recess that mates in close contact with the projection disposed on the one of the stem shaft section of the outer joint member and the inner diameter surface of the hole section of the hub, and
the projection and recess mating structure is configured so as to enable detachment by an axial direction pulling force being applied.

9. The wheel bearing device according to claim 8, wherein among the double row raceways of the inner member, one row is directly disposed in the shaft section of the hub and the other row is disposed in the inner ring press-fitted onto the shaft section of the hub.

10. The wheel bearing device according to claim 8, wherein a recessing groove is disposed on the outer diameter surface of the outer joint member, and a radial direction end surface of the recessing groove configures the stepped surface.

11. The wheel bearing device according to claim 8, wherein a projection is disposed on the outer diameter surface of the outer joint member, and a radial direction end surface of the projection configures the stepped surface.

12. The wheel bearing device according to claim 8, wherein a hardening process is performed on and adjacent the stepped surface.

13. An assembly, wherein the wheel bearing device according to claim 8 is configured by an outboard-side constant velocity universal joint, the outboard-side constant velocity universal joint being provided in a drive shaft including the outboard-side constant velocity universal joint, an inboard-side constant velocity universal joint, a shaft connecting between the constant velocity universal joints, and boots attached to the constant velocity universal joints.

14. The wheel bearing device according to claim 8, wherein the stepped surface is configured to engage an inner shoulder section of a ring-shaped body.

15. A method of assembling a wheel bearing device in which a hub, a double-row wheel bearing, and a constant velocity universal joint form a unit, and the hub and a stem shaft of an outer joint member of the constant velocity universal joint fitted into a hole section of the hub are connected by a projection and recess mating structure, wherein:

the projection and recess mating structure is configured by axial direction force being applied to a stepped surface provided on an outer diameter surface of the outer joint member by a press-fitting jig, a projection that extends in an axial direction and is provided on one of a stem shaft of the outer joint member and an inner diameter surface of the hole section of the hub being press-fitted into a partner member along the axial direction, and a recess that is in close contact with the projection over an overall mating contact area being formed in the partner member.

16. The method of assembling a wheel bearing device according to claim 15, wherein the press-fitting jig is configured by a ring-shaped body formed by a split mold, the ring-shaped body applying the axial direction load by coming into direct contact with the stepped surface provided on the outer diameter surface of the outer joint member.

17. A method of assembling an assembly configured by a drive shaft and a wheel bearing device, the drive shaft including an outboard-side constant velocity universal joint, an inboard-side constant velocity universal joint, and a shaft connecting between the constant velocity universal joints, wherein:

in the outboard-side constant velocity universal joint, a projection and recess mating structure is configured by axial direction force being applied to a stepped surface provided on an outer diameter surface of an outer joint member by a press-fitting jig, a projection that extends in an axial direction and is provided on one of a stem shaft of the outer joint member and an inner diameter surface of a hole section of a hub being press-fitted into a partner member along the axial direction, and a recess that is in close contact with the projection over an overall mating contact area being formed in the partner member.

18. The method of assembling an assembly according to claim 17, wherein:

the press-fitting jig is configured by a ring-shaped body formed by a split mold, the ring-shaped body applying the axial direction load by coming into direct contact with the stepped surface provided on the outer diameter surface of the outer joint member, and a pipe body having an inner diameter dimension that is greater than outer diameter dimensions of the outboard-side constant velocity universal joint and the inboard-side constant velocity universal joint, in which both constant velocity universal joints are housed within the pipe body during press-fitting, and the axial direction force is applied to an outer end surface of the pipe body projecting further outward in the axial direction than the inboard-side constant velocity universal joint.

* * * * *